June 4, 1968    S. EPSTEIN    3,387,268
QUOTATION MONITORING UNIT
Filed Sept. 9, 1963    7 Sheets-Sheet 1
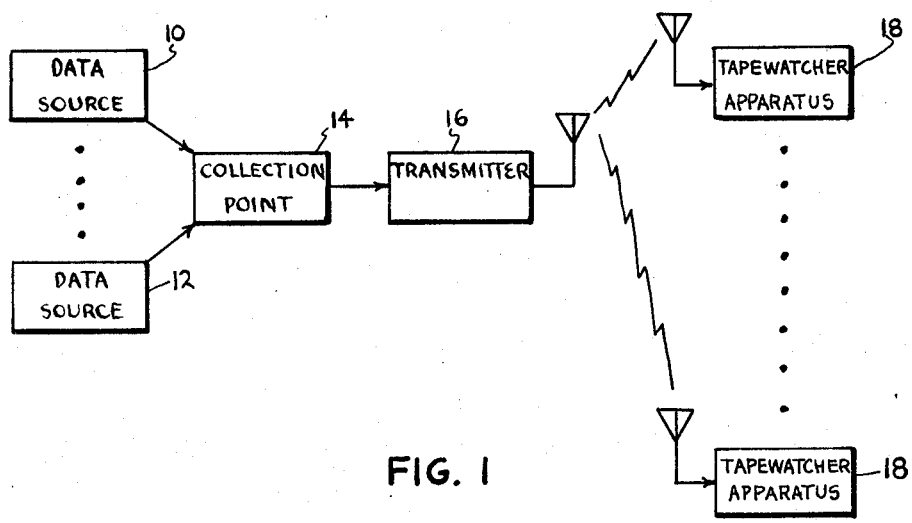
FIG. 1
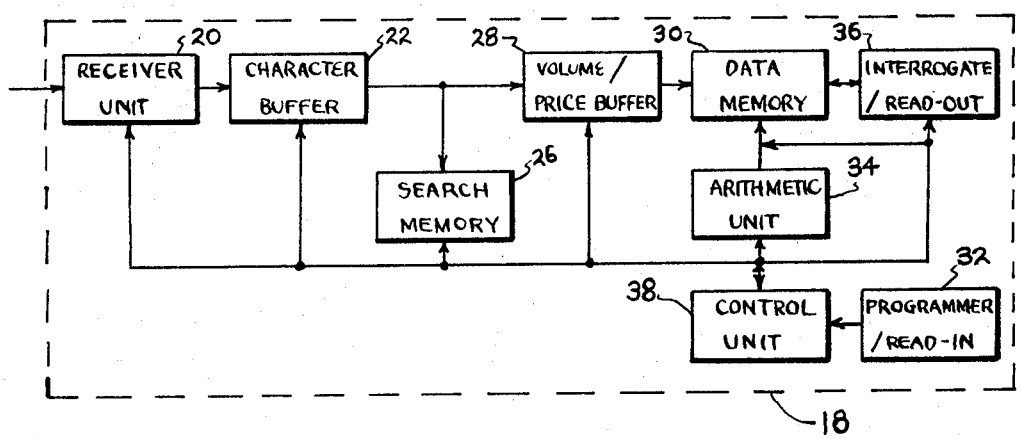
FIG. 2
| FIG. 3 | FIG. 4 | | FIG. 8 | FIG. 9 |
FIG. 10
INVENTOR
SIDNEY EPSTEIN

INVENTOR
SIDNEY EPSTEIN

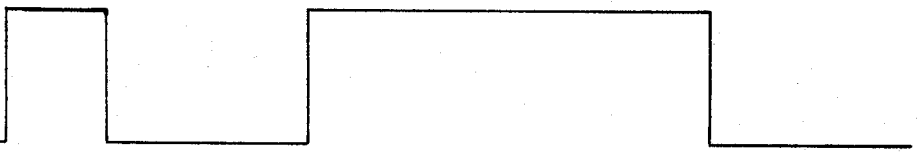
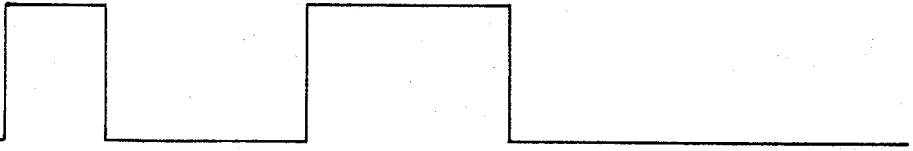
FIG. 5
INVENTOR
SIDNEY EPSTEIN

INVENTOR
SIDNEY EPSTEIN

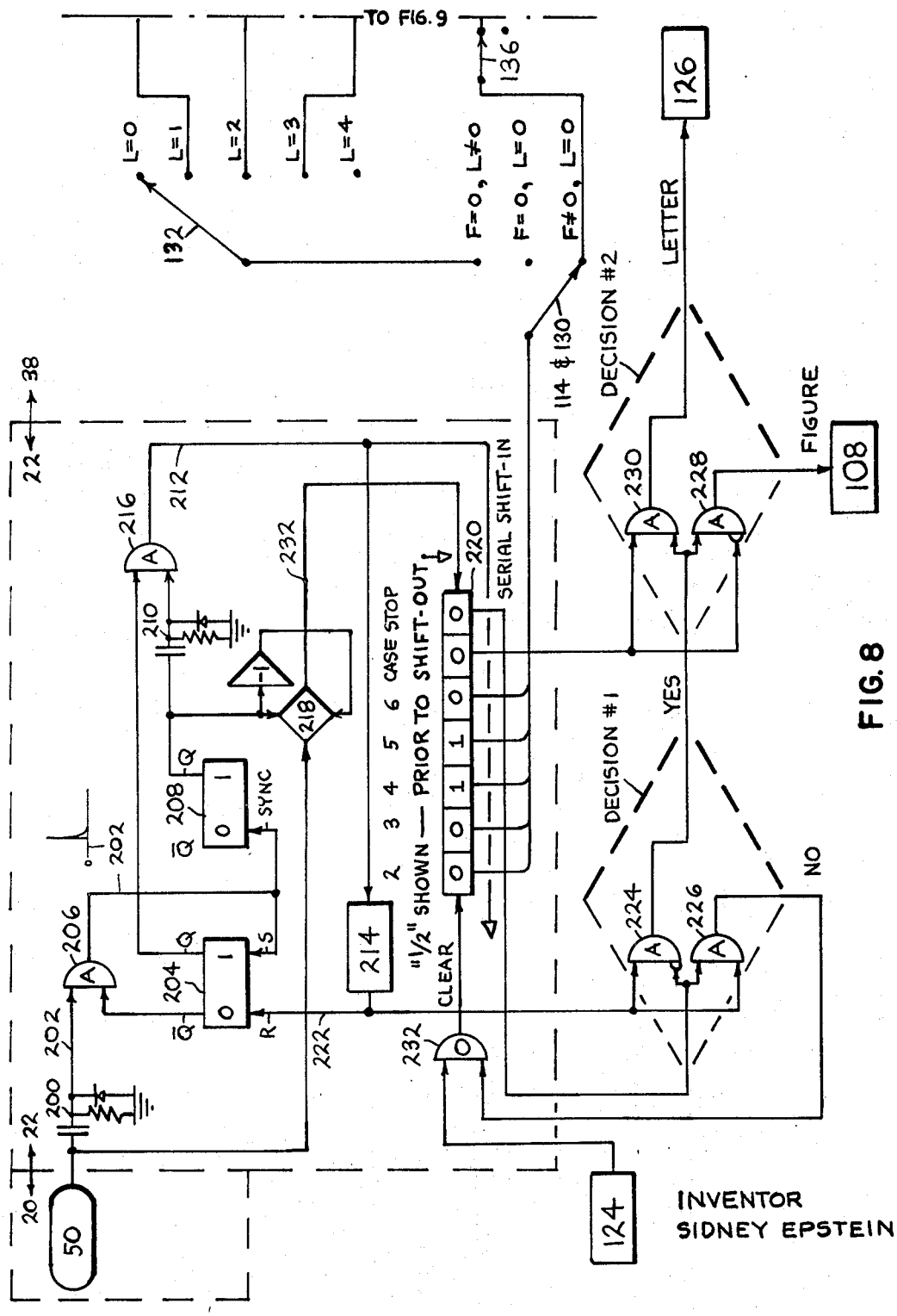

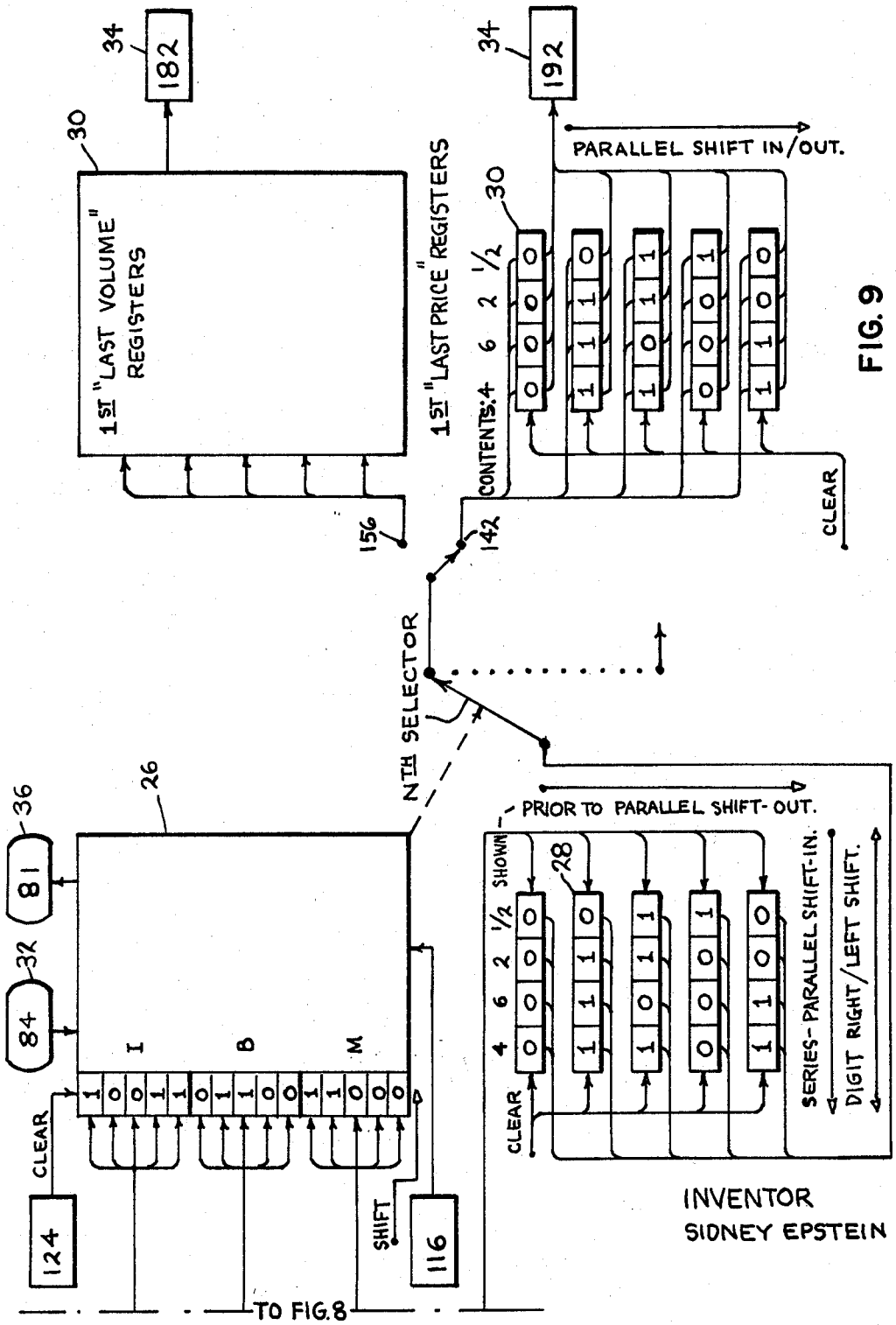

United States Patent Office 3,387,268
Patented June 4, 1968

3,387,268
QUOTATION MONITORING UNIT
Sidney Epstein, 36—11 Flatlands Ave.,
Brooklyn, N.Y. 11234
Filed Sept. 9, 1963, Ser. No. 307,588
4 Claims. (Cl. 340—154)

ABSTRACT OF THE DISCLOSURE

Remotely locatable apparatus for continuously monitoring a continuity of coded alpha numeric data representative of multiplicities of stock trading transactions transmitted over a communication channel from a central location and presettable by the user to selectively and continuously extract therefrom all transmitted data relating to a limited number of selected stocks to indicate selective changes in stock status as evidenced thereby. Included therein are storage and computer means to peform user designated operations upon the selected data to accumulate, update and oherwise prepare and store selective information based thereon for presentation thereof to the user upon a user initiated request therefor.

---

This invention generally relates to apparatus for monitoring a continuous stream of encoded messages and particularly to an apparatus for monitoring stock market ticker tape information and for effecting selective presentation of data included therein.

One of the essentials to successful stock market trading is having up-to-date information. Previous day transactions are normally adequately covered in the daily newspapers or other specialized publications but "instantaneous" information is generally only available at certain central locations to professional traders, such as brokers, "board room" habitues, or to stock exchange ticker tape subscribers. Although the amateur and absentee trader can obtain "current" information by calling his broker, such "spot checks" are, at best, unsatisfactory and generally tend to place such non-professionals at a disadvantage in the trading arena. In fact, brokers do not always have all the information readily available, for although the tape will serve to keep him up to date on the progress of the market, and his display board will serve to "memorize" and display the transactions of a representative number of stocks, the stocks of particular interest to his clients may or may not be numbered amongst those on the display board. In such cases the broker must resort to the time honored ritual of obtaining a "quote" or retrace his tape in order to reconstruct the requisite market information both being relatively time consuming and tedious jobs.

The proposed apparatus is intended to obviate the aforementioned difficulties by continuously monitoring a coded data stream representative of market transactions selectively storing and updating all pertinent preselected information concerning previous transactions for a predetermined number of subscriber selected stocks and rendering such data available to the subscriber on demand.

Among the advantages of the subject apparatus is the provision of ready availability of the latest prices for each of the stocks being monitored as well as the ready availability of other pertinent desired information such as opening or first, high, low, and last prices cumulative volume, quotes etc., which the subject unit has been automatically and continuously compiling, memorizing and up-dating since it went on-line at the opening of a trading session with all such functions being performed by a unit of small size and with a small scale memory or storage component located in the subscriber's office or other convenient locale and in accord with the needs and desires of the subscriber. Still another advantage of the subject apparatus is the permitted programming thereof to give attention arresting warnings whenever one of the monitored stocks undergoes a predefinable type of activity such as a trade, exceeding a predetermined volume or price change, approach of buy or sell levels and similar criteria.

As will be apparent from what follows, the subject apparatus provides a subscriber with both up to date and accumulated information so as to permit immediate and informed action, and as such still place a subscriber, at locations remote from the trading area, with information equivalent to that obtainable by being present on the trading floor or in a board room with a corps of assistants to effect the preliminary desired data screening, reminding, evaluating, tabulating and other related activities.

Most, if not all of the prior art systems are of the type disclosed in Patent No. 3,082,402 by J. R. Scantlin, which utilize the techniques of electronic data processing to automate stock market quotations and attempt to replace the conventional client phone call to the broker. These units normally include a large scale centrally located storage, client or customer initiated interrogation and a read-out system to provide the subscriber with a visual or audio data display. Such systems, however, are designed to be of primary value to the broker; i.e., they either speed up the stock quotation process for him, thereby increasing his productivity, or serve to relieve him of the burden of personally answering cilent's requests for information. Insofar as the client is concerned, these prior art systems are of dubious value since the client must interrupt his work and initiate the quotation request, by telephone call or otherwise. As is well known, such a random and haphazard sampling of stock market action is not conducive to successful trading. Client initiated calls via prior art telephone-type systems, neglecting congestion problems or busy signals which will probably occur at the most inopportune times, will result in the rendering of information concerning one stock only. As a practical matter in the utilization of such systems the client is really not much better off than under present day practices wherein he calls his broker and gets "spot checks" on the market and particular stocks. The ready acquisition of specific, up-to-date stock market information has been a problem of long standing for the non-professional or absentee (absent from exchange trading floor or broker's boardroom) trader.

Although the specific embodiment of the apparatus herein described is particularly adapted to monitor stock market quotations, it will be apparent that the same would find utility in any type of communication system where it is desirable to monitor a continuous stream of messages and have it automatically respond to and/or memorize data content of selected messages which arrive at random times. Each message consists of two parts, the "address" part and the "data" part. The address of any particular apparatus may be changed at will and any particular apparatus may have a plurality of addresses.

To illustrate the concepts involved in this invention, the following portions of this specification will be based on a system employing the 500 character per minute stock ticker code currently in use. An outline of such code is set forth in U.S. Patent 3,001,153 to Haselton. Briefly, all alphanumeric characters, plus special characters, consist of eight equal time divisions, called "bauds." A character always starts with a "space" baud, followed by five data bauds, each of which may be either a space baud or a "mark" baud, depending upon the character to be represented and the code used, a "case" baud, and stops with a mark baud. A mark is used to indicate the "figure" case which consists of numerals and special characters, and a space is used to indicate the "letter" case which consists primarily of alphabetic characters. The electrical voltage used is bivalued; customarily, a positive voltage is used to indicate a space, and a negative voltage is used to indicate a mark and the "rest" position, i.e., the absence of a character or the wait between characters.

Other objects and advantages of the subject invention will be apparent from the following specification and claims and from the accompanying drawings which illustrate the principles of the invention as incorporated in a presently preferred embodiment thereof.

Referring to the drawings:

FIGURE 1 is a schematic diagram of the system and its major components.

FIGURE 2 is a schematic block diagram showing the major components of thes ubscriber located units forming the subject and instruction flow chart for the subject unit.

FIGURES 5A through 5F are "Baud/Bit" timing diagrams.

Figure 3:
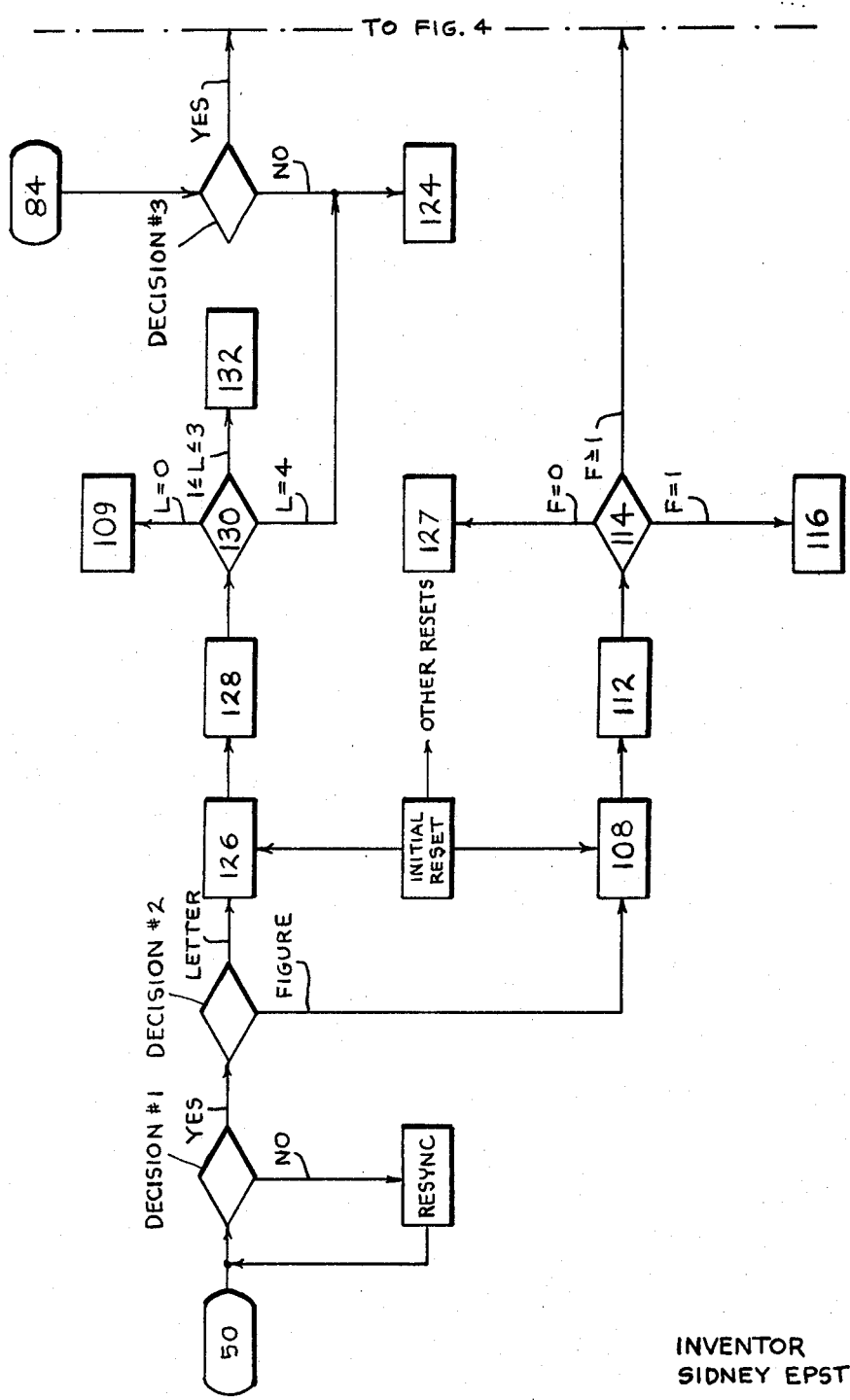

FIGURES 8 and 9 compositely form a simplified schematic-wiring/logic diagram of certain key operations.

Referring to the drawings and particularly to FIGURE 1, there is provided a plurality of data sources 10, 12 such as stock exchanges A and B. Stock transaction data is conveyed to a suitable code at a collection and encoding location 14 and is transmitted by the transmitter 16 to the "tape watcher" apparatus forming the subject matter of this invention. As will be apparent, data transmission to local subscribers may be effected via wire services or radio or by any other means of communication effective for dissemination of an effectively continuous stream of encoded data.

FIGURE 2 illustrates the essential components of the "tape watcher" units 18 forming the subject matter of this invention. Included therein is a receiver unit 20 which detects, converts, amplifies, and demodulates the input data stream.

The demodulated output data stream from the receiver 20 consisting of a stream of coded alphanumeric characters, representative of the incoming intelligence, is then fed to a character buffer/synchronization unit 22. As will be later described in greater detail, the coded characters are synchronized, sampled and clamped by a synchronous clamp type of transmission gate to convert the same from the mark-space form to digital-binary-bit form. The result of this conversion of bauds to bits is illustrated by FIGURES 5B and 5E, respectively. The resulting character bit output, synchronized both "character-wise" and "bit-wise," are shifted serially into a shift register where they are temporarily stored. The moment a character is stored in the shift register a signal is generated to initiate decisions based on the type of information represented by the letter or figure case nature of said character, the history of preceeding characters, that is whether letter case characters represent a stock symbol or not or whether figure case characters represent volume or price data, and information inserted by the subscriber, such as, for example, the designation of which stocks' volume and price data is to be memorized, and whether the data pertains to all other stocks which is to be rejected.

If the character is in the letter case it is assumed to be part of the address or stock symbol part of the stock message. For example, it may be one of the letters in the symbol, IBM, and will be sent to the appropriate storage register of the search memory unit 26. When all of the letter characters which comprise a given stock symbol are disposed in the search memory 26, a signal is generated to initiate a decision as to whether or not the succeeding figure case characters, representing the data part of stock message, pertain to a stock of interest or not. If not, said characters are discarded. Associative memory techniques, as described at pages 8–11 in the July 5, 1962 issue of Electronic Design, vol. 10, No. 14, could be used with advantage in the search memory unit 26.

On the other hand, should succeeding characters pertain to a stock of interest, they will be routed to the appropriate storage bins of the volume/price buffer unit 28. In addition to the above, additional decisions have to be made to identify and separate volume data from price data, and to route the same to the appropriate "last volume" and "last price" storage bins allocated to that particular watched stock of the data memory unit 30. The data memory unit 30 may conveniently consist of low cost per bit memory elements such as miniature magnetic cores as described at pages 231–271 of Computer Logic by Flores (Prentice-Hall, 1960).

Figure 6:
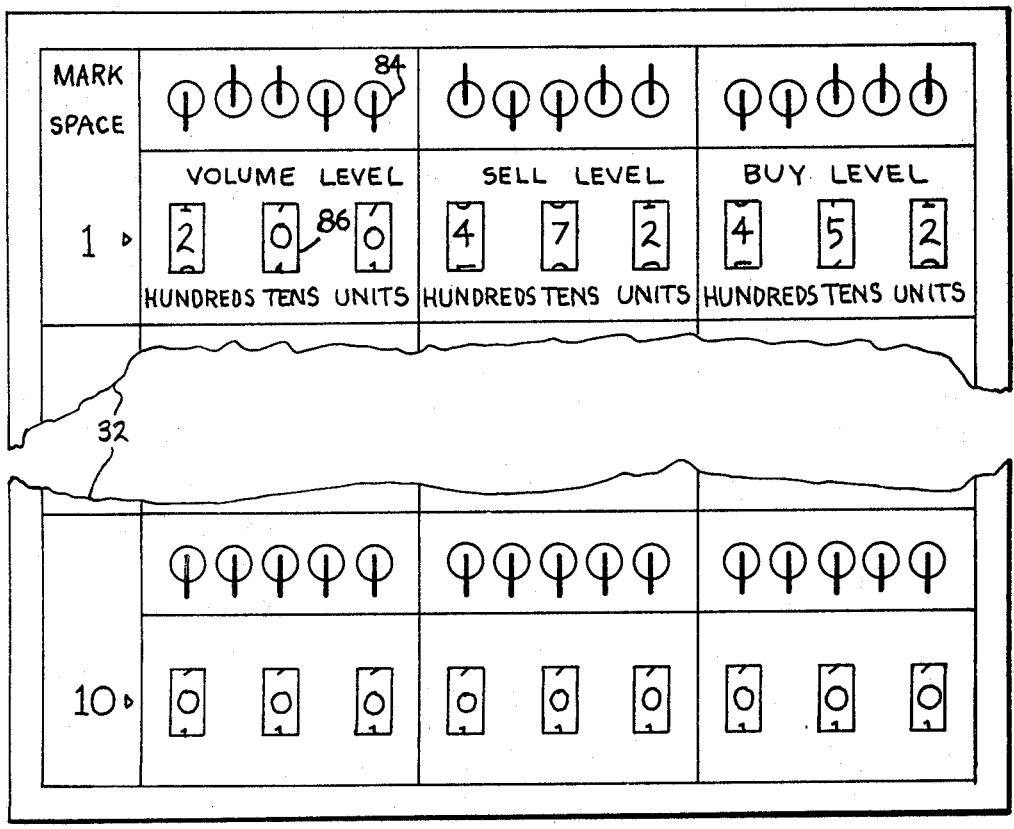
FIGURE 6 is a schmatic plan view of the front panel of the read-in/programmer unit.

By way of example, it may be assumed that the subscriber has designated IBM as watched stock #1. This information is inserted by the subscriber into the apparatus via the read-in/programmer unit 32. FIGURE 6 illustrates a presently preferred embodiment of the read-in/programmer unit 32 of the type wherein the subscriber sets up the desired stock symbol by putting toggle switches in the mark or space position in accordance with the code used to transmit the alphabetic (letter) characters.

The raw data, that is the up-dated "last volume" and "last price" for said watched stock #1 will be available to the subscriber in the data stream as soon as stock #1 trades. From the last transaction and previously monitored transactions of stock #1 other information of importance to a trade such as cumulative volume, opening, high, and low prices, etc. can be automatically calculated and stored in the data memory unit 30. These calculations are effected by an interchange of data between the data memory unit 30 and the arithmetic unit 34. The arithmetic unit 34 may conveniently consist of conventional digital logic circuits to shift, add, subtract, compare etc.

Figure 7:
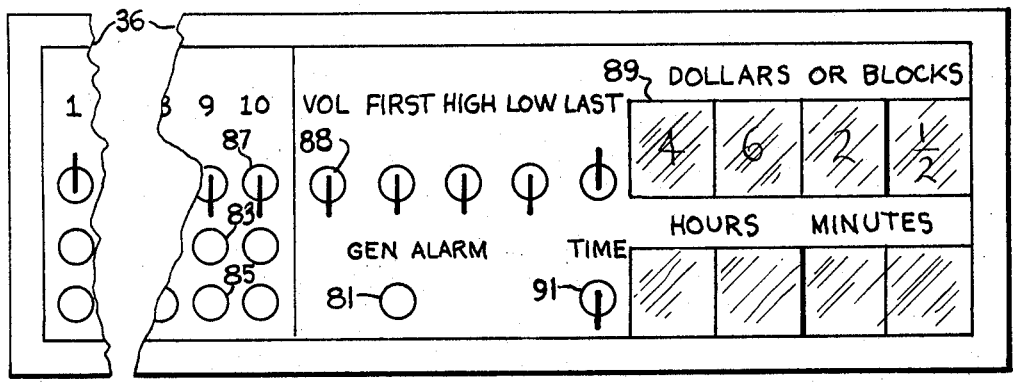
FIGURE 7 is a schematic plan view of the front panel of the read-out/interrogate unit.

At any time after watched stock #1 has been set up as such, the apparatus will recognize the stock symbol identifying stock #1 messages and utilize the data content of said messages to up-date memories of all pertinent volume and price data categories, perform technical operations upon said data and activate attention arresting warning devices to alert the subscriber that something of interest has happened. The subscriber is now in a position to observe up-to-date data concerning the watched stock via the read-out/interrogate unit 36. FIGURE 7 illustrates a presently preferred embodiment of the read-out/interrogate unit 36 of the type wherein data is visually displayed in response to toggle switch programming control. All decisions, operations, internally generated signals, timing, etc. are under the control of the control unit 38.

Figure 4:
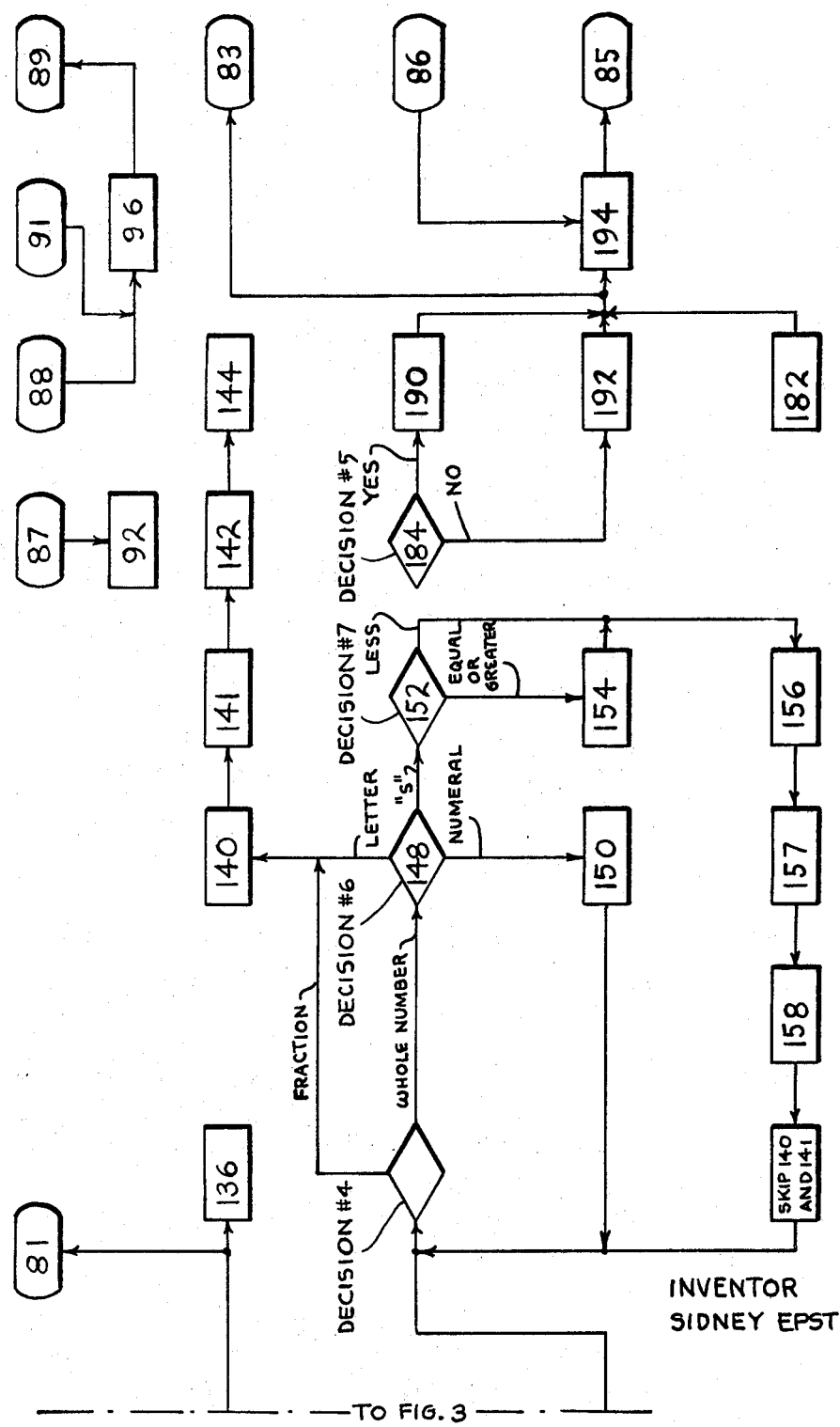

By way of further description, a detailed description of the operation of the subject apparatus, referenced to the FIGURES 3 and 4 flow chart follows.

The output of the receiver unit 20 is represented by the demodulated message stream 50 in which each message consists of an address portion and a data portion. By way of example of an address character, the demodulated code configuration for the envelope for the letter character A is shown in FIG. 5a and, as exemplary of a data character, FIGURE 5b shows the figure character, ½.

The demodulated message stream 50 representing the totality of the incoming intelligence, is fed to the character buffer/synchronization unit 22 which basically is a digital shift register operating in conjunction with character synchronization circuitry. The digital shift register is of conventional construction as disclosed at pages 162–171 of Computer Logic by Flores (Prentice-Hall; 1960). FIGURE 8 is exemplary of the circuitry used for the character/synchronization unit. As there illustrated, the demodulated data stream output 50 of the receiver unit 20 is fed to a differentiating network 200 which operates on the positive rising voltage step, for example, of the "start" bit, yielding the positive output pulse 202. This pulse and the positive step output of a "flip-flop" multivibrator 204 are fed to an "and" gate 206. The symbols for the multivibrator, "and" and "or" circuits and the notation utilized conform to that employed at page 48 and at pages 31–35 of "Arithmetic Operations in Digital Computers" by Richards (Van Nostrand, 1956). The output of the "and" gate is a pulse 202 which is fed to the "set" or "1" line of the multivibrator 204 which serves to cause the "true" output, $Q^{n+1}$ thereof to go to "1" and to prevent any further pulses from coming through until the bistable multivibrator 204 receives a signal on the "reset" or "0" input line thereof. Suitable circuitry for the multivibrator's art "and" and "or" circuits is disclosed in Phister's "Logical Design of Digital Computers" (Wiley, 1958) at pages 112–132. The output pulse of the "and" gate 206 also synchronizes the astable asymmetrical multivibrator 208 "bitwise" at a nominal frequency of 66⅔ cycles per second, say. The "true" and "complementary" outputs of the multivibrator 208 are shown in FIGURES 5C and D, respectively. Examples of multivibrator synchronization are disclosed in Millman and Taub—Pulse and Digital Circuits (McGraw-Hill, 1956) pages 360–362. The Q, (true) or "1," output of the astable, asymmetrical, multivibrator 208 is fed to a differentiating network 210 which yields a continuous series of positive pulses, one per bit time. Since multivibrator 204 gives a positive step voltage on its Q output line, said series of pulses are gated into an 8-count counter 214 by the "and" gate 216. A suitable construction for the counter 214 is shown in Richards—Arithmetic Operations in Digital Computers (Van Nostrand, 1956) at pages 193–208. As bit times generate the pulse train 212, as shown in FIGURE 5f, character data, such as shown in FIGURE 5b, enters the synchronous clamp type of transmission gate 218 and leaves, as shown in FIGURE 5e, to go to the digital shift register 220. Suitable transmission gate circuitry is disclosed in Millman and Taub—Pulse and Digital Circuits (McGraw-Hill, 1956) at pages 126–129, 447–457. The pulse train 212 is fed to the "shift" input of the shift register 220, causing the character bits, as shown in FIGURE 5e, to be shifted into the shift register 220.

When the counter counts to 8, a pulse appears on line 222, which resets the "flip-flop" multivibrator 204 in preparation for the next "start bit," and is also fed to "and" gates 224 and 226.

At this point decision #1 (see FIGURE 3), based on the question, "Is the character in the character buffer synchronized?" can be made. If the character is synchronized, a "0" will be in the "stop" bin of the shift register 220. The output of the "stop" bin is then fed to the input lead of "and" gate 226 and the "inhibit" lead of "and" gate 224. The "inhibit" symbol is of the type defined at page 46 of Richards—Arithmetic Operations in Digital Computers (Van Nostrand, 1956). A pulse will now appear on the output line of the "and" gate 224 which indicates that the answer to the query is "yes."

If the character is not synchronized, the "stop" bin may contain a "1" or a "0." If it contains a "1," a pulse will appear on the output line of "and" gate 226. The presence of this signal indicates that the answer to the question posed by Decision #1 is "no." Referring now to FIGURE 3, the next operation is, in each case, resynchronization and return to Decision #1. This operation is performed by sending the output of "and" gate 226 through the "or" gate 232 to the "clear" input lead of the shift register 220. If, on the other hand, the "stop" bin of the shift register 220 contains a "0," the most probable cause of this zero is due to the "rest" position between characters. If so, the next character will be synchronized. If not, it will take a few character times to synchronize. In any case, synchronization will be accomplished within a few character times.

Because of the selectivity of the herein described "tape watcher" unit, the overall probability of error is quite small and this will be discussed in more detail at a later point in this application in connection with non-quote message rejection. Of course, synchronization would not present much of a problem if a special stock quotation message "framing" signal were used.

Once the characters are synchronized, Decision #2 has to be made and is based on the question: "Is the character in the character buffer in the letter or figure case?" This, and all other operations, are controlled by the control unit 38. Representative examples of control unit operations are disclosed at pages 273–303 of Computer Logic by Flores (Prentice-Hall, 1960). The output of "and" gate 224 and the output line of the "case" bin of shift register 220 are sent to "and" gates 228 and 230. "And" gate 228 has an "inhibit" in the lead from the case bin of 220. If the character is a letter case character, the "case" bin will contain a "1" and a signal will appear at the output of "and" gate 230, the letter line of Decision #2, signifying that the answer to Decision #2 is "letter."

Returning again to FIGURE 3, if it be assumed that the character in the character buffer unit 22 is a figure case character, the next operation is 108 that delineates "set the L counter equal to zero." This serves to set the L counter in the control unit 38. The next operation 112 is to replace the count F with $F+1$ which, in this instance, is "replace 0 with 1." This instruction is carried out by the next operation 114 to travel in accord with the previous instruction and since F equals 1, the next operation 116 is an interrogation of the search memory unit 26. Since it is one of the features of the tape watcher unit forming the subject of this invention that the subscriber may change the stocks to be watched at any time, the preselected coded stock information to be watched is insertable by the subscriber as at 84 via the read-in/programmer unit 32. Such action serves to introduce the information corresponding to the stock symbols to be watched in the search memory unit 26. The associative memory technique, as described at pages 8–11 of the July 5, 1962 issue of Electronic Design (vol. 10, No. 14) may suitably be used with advantage in the search memory unit 26. The next decision that has to be made is Decision #3— Does the character stored in the character buffer unit 22 represent data pertinent to a watched stock? Since it has been assumed that the first synchronized character since the unit went on-stream was in the figure case, no incoming stock symbol data is in the stock symbol address register of the search memory 26. As such, therefore, the answer to Decision #3 must be "no" and the next operation 124 is a clearing of the stock symbol address register of the search memory 26 and a re-cycling of operations back to Decision #2. When this operation has been executed, and search memory 26 registers will have been cleared of incoming data and the character buffer 22 will be ready to receive and store the next character upon arrival. Succeeding figure case characters will be discarded. If it be assumed that the next character is a letter case character, the next operations called for in answer to Decision #2 are now first to set the F counter equal to zero (126); second, to set up as at 127 parallel paths to the stock symbol address registers in the search memory 26 and third, to replace as at 128 count L with $L+1$. Since the L counter now contains a 1, the branch operation 130 initiates operation 132 which is a routing of data from the character buffer 22 to the $L^{th}$ stock symbol address register in the search memory 26 and a cycling of operation back to Decision #2. The 1st letter of the incoming stock symbol is now in the 1st stock symbol register of the search memory 26. The above cycle of operations occurs 1, 2 or 3 times depending upon the number of letter characters in the stock symbol. The incoming message stock symbol is now loaded into the stock symbol address registers of the search memory 26.

Before continuing with the description of the tape watcher unit, it should be noted that the subject unit includes the automatic rejection of non-stock data messages. This is a problem because it is the practice to send messages other than stock quotes or stock transactions over the ticker services. This problem is herein solved satisfactorily by utilizing the fact that a stock symbol consists of at most 3 letters. Counter L is a modified modulo 4 counter, i.e., it counts 1, 2, 3, 4, 1, 2, 4, 0, 1, 2 . . . etc. When L is 4, it calls for operation 124—Clearance of the stock symbol address registers in the search memory 26 and a return operation to Decision #2, thereby rejecting the pseudo stock symbol address data in the search memory 26. Thus any non-quote message will be rejected in groups of 8 letter characters until the end of the message or until a figure character appears. When either of these events occur, the probability of having a pseudo stock symbol in the search memory 26 is high, but, there are more than $32 \times 10^3$ possible stock symbols of which only a few, say ten, are to be watched. Therefore, non-quote messages will be rejected with a vanishingly low probability of error. Since data stored in tape watcher is continually up-dated, and some of it is redundant, i.e., a number of trades at different times but at the same price or fractionally different, satisfactory operation is assured. The insignificant error could be eliminated if punctuation marks are used or if special characters heralding the arrival of non-quote messages were used. Other special characters, e.g., indicating the beginning and end of a "late tape," would also be of value.

Returning now to the outline of operation, the next character to be loaded into the character buffer 22 should be a figure case character, since volume and price data normally follow stock symbol information. Here again Decision #2 requires a first operation 112 of the replacing count F with F+1 followed by a second operation 114 in response thereto and a third operation 116 of interrogating the search memory of unit 26; a fourth operation 109 sets up the parallel data paths to the registers in the volume/price buffer unit 28. If the stock symbol data loaded into the search memory 26 checks against the inserted stock symbol information as one of the stocks being watched as, for example, the Nth watched stock, the attention arresting alarm 81 will be initiated. Coincidently therewith operation 136 transfers the 5 data bits from the character buffer unit 22, in parallel, to the fraction bins of the 5 paralleled 4-digit shift registers comprising the volume/price buffer unit 28. The first volume-price character is now loaded into the volume/price buffer unit 28 as shown in FIGURE 9.

Acting on the data stored in the fraction bins (the rightmost bins) of the volume/price buffer unit 28, decision #4 inquiry as to whether the character in question is a fraction or a total number has to be carried. If it be assumed that a fraction appears in the rightmost bin and that the next character is a letter character, such would indicate that 1 block or "unit" of stock traded at that fractional price. Operation 140 is then performed to introduce the coded equivalent of the numeral 1 in the units bins of the "last volume" registers, for the Nth watched stock, in the data memory unit 30. This is followed by initiation of operations 141 (for 1 block) and 182 (for more than 1 block) consisting of adding data in the Nth "last volume" register to data in the Nth accumulator register in the data memory unit 30. After completion of the above, operation 142 is initiated to route data from the volume/price buffer 28 to the Nth watched stock "last price" registers of the data memory unit 30, to initiate Decision #5—i.e. Is the price data in the Nth "last price" register of the data memory unit 30, the opening or first price? Subsequent thereto operation 144 is effected to gate digital time equivalent into "time of last trade" register for the Nth watched stock in the data memory 30.

Another possibility, the most probable one, would be the case where 1 block of stock is traded at a price consisting of a whole number plus a fraction. In this instance, the answer to Decision #4 would call for a determination 148 (Decision #6) of whether the character in the character buffer 22 is in the letter case, a figure case "s", or a numeral; the answer to which has been initially assumed to be "whole number." Price data usually requires a maximum of 3 decimal digits and a "fraction" digit, therefore, the cycle of Decision #4, determination 148 and operation 150 to shift existing data in the volume/price buffer 28 one digit to the left and transfer data from the character buffer 22 to the rightmost bins would continue until a fraction appeared in the rightmost bins of the volume/price buffer unit 28 shift registers or a letter character appearing in the character buffer/synchronization unit 22 shift register. The succeeding operations would then be a repeat of operations 140, 141, 142 and 144 as above described.

The next possibility that will be considered is that more than 1 block will be traded. Whole numbers call for the operational cycle of Decision #4—i.e.—Is the character in the fraction bins of the volume/price buffer 28 a fraction or a whole number?—followed by determination 148 of whether the character in the character buffer 22 is in the letter case, figure case "s", or a numeral, followed by operation 150 to shift existing data in the volume/price buffer 28 one bin or digit to the left and transfer data from the character buffer 22 to the rightmost bins—as before until the figure case "s" is stored in the shift register of the character buffer 22. This indicates the end of volume data and the next determination 152 (Decision #7) that must be made: Is the number stored in the volume/price buffer 28 less than, equal or greater than, 10?. This decision is necessary because it is customary to write out the full number of shares traded if the transaction consists of 1000 or more shares. If the answer is "equal or greater than" the next instruction is to effect operation 154 to shift numerals stored in the volume/price buffer 28 one digit to the right. Since the unit will utilize "blocks" (usually 1 block equals 100 shares) in its calculations and presentation, the next operation 156 will be a routing of data for the volume/price buffer 28 to the Nth watched stock "last volume" registers of the data memory 30. On the other hand, if the answer is "less than" the sequence is from decision 152 to operation 156 directly. The next operation 157 will then be an instruction for initiation of operation 182 to add data in the Nth "last volume" register to data in the Nth accumulator register of the data memory unit 30. Once the volume data has been transferred from the volume/price buffer 28 registers to the Nth watched stock volume registers of the data memory 30, operation 158 is initiated to clear the registers of the volume/price buffer 28. Succeeding data must be price data. Volume and price data for the Nth watched stock are now in the Nth "1st volume" registers, the Nth "last price" and time thereof registers of the data memory 30. Examples of suitable data memories are disclosed at pages 231–271 of Flores—Computer Logic (Prentice-Hall, 1960).

By virtue of the high-speed electronics, as soon as the last price character of the Mth stock message comes through, the tapewatcher unit, hereinafter abbreviated by TW, is ready to start processing the first character of the stock symbol of the (M+1)th message. At the same time, TW is processing the Mth stock message data. For the remaining operations of TW, speed requirements may be relaxed somewhat, since the time now available to perform these operations is in the order of character time rather than bit time.

The first data processing operation 184 to be performed on the stored "last price" data is a determination of whether the price data in the Nth "last price'" register of the data memory unit 30 is the opening price or not. If the answer is yes, operation 190 is performed to also route the Nth last price data to the Nth first, high, and low price registers of the data memory unit 30. If the answer is no, operation 192 is effected in order to perform calculations to determine the Nth high and low prices, up date contents of respective registers and up date time of high and low prices, add "last volume" data to data in the Nth accumulated volume register. This is followed by operation 194 which performs calculations based on pre-programmed technical analysis of market action—e.g.—buy-sell levels, unusual volume-price activity, etc. These operations take place in the data memory unit 30 and the arithmetic unit 34 under control of the control unit 38. Suitable examples of electronic arithmetic techniques are disclosed in Ledley—Digital Computer and Control Engineering (McGraw-Hill, 1960) at pages 485–542.

All of the preceding operations are performed automatically. The unit continually compiles data pertaining to the watched stocks and performs the desired calculations upon the data. The subscriber, prompted by the attention arresting warnings or on his own initiative, may interrogate the unit at any time and obtain data on demand.

The information read-in and data read-out processes and equipment will now be described. A possible configuration for the read-in/programmer unit 32 is shown in FIG. 6. The subscriber sets the rows of symbol information switches 84 to correspond to the stock symbols of the stocks to be watched. Assume that the capacity of the unit is 10 stocks and that the subscriber has decided to watch the following two stocks, International Business Machines, stock symbol IBM, and Standard Oil of New Jersey, stock symbol J. Let watched stock #1 (i.e.. $N=1$) be IBM. Since the stock symbol IBM contains 3 letter characters, and each character contains 5 bits of information, 15 switches are used, in groups of 5, each switch capable of 1 bit of information. Said switches will be thrown to their "mark" or "space" positions in accordance with the stock ticker code used. Let the watched stock #2 be J. Since this stock symbol contains only 1 character, the first group of 5 switches is set-up for the character J. The other 10 switches are put into the "space" position, since the 5 space bit combination does not correspond to any character. Parenthetically, it should be pointed out that the above manipulations are all that are required for the basic operation of the disclosed unit. Subscribers would only get alarms and last prices, and TW would be simplified accordingly. Additional information to effect the automatic performance of operation 194, such as the performing of calculations for pre-programmed analyses of market action, such as buy, sell, unusual activity and the like criteria may currently be fed in via thumb-wheel switches 86, for each of the watched stocks.

The subscriber is now free to attend to his usual activities. When one of the watched stocks trades, the attention arresting warning, which may be a buzzer or flashing light, is activated to notify the client that something of interest has occurred. All alarms would preferably be located, as is the general alarm 81, on the read-out/interrogate unit 36.

A possible configuration for the read-out/interrogate unit 36 is shown in FIG. 7. Included therein is a specific signal such as a pilot light 83, of, say, 1 minute duration, is activated to indicate the specific stock which triggered the alarm. Knowledge of unusual activity is very important; should one of the watched stocks manifest this phenomenon, a continuously flashing light 85 might be used to indicate the specific stock; e.g., a "late tape," wherein only the last digit and the fraction of the price data are transmitted, is an important event. This event would activate the entire line of flashing lights instruct TW to operate on the truncated prices. In fact, TW could be simplified so as to only operate on the truncated prices at all times, with an attendent saving in components and memory capacity.

By the above described indications, the subscriber now knows which one of the stocks has been traded. In order to obtain the requisite data for it, he merely turns on a stock selector switch 87, which sets up the appropriate data retrieval circuits 92, corresponding to activated alarm in row 83. For example, if it be assumed that watched stock #1 triggered the alarms, the stock selector switch #1 would be thrown on. This operation automatically sets up the circuits for data returned from the Nth area of the data memory unit 30. The stock read-out switch 88, corresponding to "last," would then be turned on. This operation effects a non-destructive interrogation and translation operation 96 on the contents of the desired data register of the Nth area of the data memory 30. Such interrogation and translation will conclude with a presentation of the desired data to the subscriber by means of a numeric read-out unit 89 or other display means as disclosed, for example, in the Burroughs Corporation "Nixie" tube catalog. For example, the desired data may conveniently be presented as 462½ on the hundred, tens, units, and fraction numeral read-out devices 89, respectively. Should subscriber be interested in volume, high, low, or first price, the switch marked "last" would be turned off and the appropriate switch 88 would be turned on. Furthermore, should the client desire to know the time of said price occurrence, the "time" switch 91 is put on concurrently; price and time data will be read-out simultaneously on the upper and lower tiers or the read-out unit 89 respectively. Above operations are illustrated for IBM, watched stock #1, last price 462½, from an external point of view in FIGURES 6 and 7 and internally in FIGURES 8 and 9.

Should circumstances prevent the subscriber from taking advantage of the "instantaneous" data available from the units, that is where the subscriber leaves the proximity of the unit for period of time during the trading day, he may interrogate the unit upon his return to obtain rapid quotes, since the unit has been monitoring the market in his absence.

Relatively uncommon special characters such as the one signifying a preferred stock have not been included in the description of the apparatus.

What I claim is:

1. Apparatus for continuously monitoring a continuity of coded alpha numeric data discretely representative of multiplicities of essentially chronologically arranged stock trading transactions transmitted substantially continuously over a one way communication channel from a central location and wherein said coded data at least includes discrete stock symbol and price indicia and said apparatus is located remote from said central location comprising coded data receiving means for continuous reception of said continuity of transmitted data and serial introduction thereof into temporary storage means,
synchronizing means included in said receiving means for converting said alpha numeric coded data into digitally coded units,
first control means settable in accord with the dictates of the user for designating a predetermined selected number of stocks to be continuously monitored,
means responsive to the settings of said first control means for continuously comparing the stock symbol identity of the designated stocks with each discretely representative item of coded stock symbol data disposed in said temporary storage means,
means continually responsive to compared coincidence between the stock symbol identity of a designated stock and the stock represented by a discretely representative item of received coded stock symbol intelligence for effecting selective acceptance of the data represented thereby,
means for storing said selectively accepted data,
second control means settable in accord with the dictates of the user for designating desired operations to be performed upon said selectively accepted data,
operating means responsive to the settings of said second control means and including data processing means for performing the said designated operations upon said selectively accepted data,
third control means responsive to the information dictates of the user for selecting data for presentation, and display means responsive to the settings of said plurality of control means for presenting the output of said operating means as readily ascertainable intelligence to the user of the apparatus in response to the information dictates thereof.

2. Apparatus as set forth in claim 1 including means responsive to each instance of compared coincidence between a designated stock and a stock represented by a discretely representative item of received coded intelligence for alerting the user of the presence thereof.

3. Apparatus as set forth in claim 1 wherein said data processing means in said operating means includes a data memory means, computer means and data interchange communication lines therebetween to accumulate and update stored data for each stock designated by the settings of said first control means.

4. Apparatus for continuously monitoring a continuity of coded alpha numeric data discretely representative of multiplicities of essentially chronologically arranged stock trading transactions transmitted over a communication channel from a central location and wherein said coded data at least includes an address portion representing the stock symbol and a figure portion representing at least a price indicia and said apparatus is located remote from said central location comprising, coded data receiving means for continuous reception of said continuity of transmitted data and serial introduction thereof into temporary storage means, synchronizing means included in said receiving means for converting said coded data into digitally coded units, first control means settable in accord with the dictates of the user for codedly designating the address portion of a predetermined selected number of stocks to be continuously monitored, means responsive to the settings of said first control means for continuously comparing the identity of the designated stocks with the address portion of each discrete data item disposed in said temporary storage means, means continuously responsive to compared coincidence between the coded designations of the selected stocks and the coded address portions of each discrete data item for effecting selective acceptance of both the address and figure portions thereof, means for separately storing said selectively accepted data for each of the designated stocks, second control means settable in accord with the dictates of the user for designating desired operations to be performed upon the figure portions of the selectively accepted data of each of the designated stocks, operating means responsive to the settings of said second control means including data memory means, computer means and data interchange communication lines therebetween for performing the said designated operation upon said selectively accepted data, third control means settable in accord with the dictates of the user for selecting data from said data memory for presentation, and display means responsive to the settings of said third control means for presenting the output of said operating means as readily ascertainable intelligence to the user of the apparatus in response to the information dictates thereof.

References Cited
UNITED STATES PATENTS

| | | | |
|---|---|---|---|
| 2,375,383 | 5/1945 | Potts | 340—154 |
| 3,011,153 | 11/1961 | Haselton et al. | 340—154 |
| 3,230,508 | 1/1966 | Grijseels et al. | 340—154 |
| 3,253,263 | 5/1966 | Lee et al. | 340—154 |
| 3,283,304 | 11/1966 | Sinn et al. | 340—152 |
| 3,310,782 | 3/1967 | Sinn et al. | 340—152 |

JOHN W. CALDWELL, *Primary Examiner.*

NEIL C. READ, THOMAS B. HABECKER,
*Examiners.*

A. J. KASPER, *Assistant Examiners.*

UNITED STATES PATENT OFFICE
CERTIFICATE OF CORRECTION

Patent No. 3,387,268                                                  June 4, 1968

Sidney Epstein

It is certified that error appears in the above identified patent and that said Letters Patent are hereby corrected as shown below:

Column 2, line 65, "3,001,153" should read -- 3,011,153 --. Column 3, after line 19, insert -- FIGURES 3 and 4 compositely form a combination signal and instruction flow chart for the subject unit. --. Column 7, line 49, after "carried" insert -- out --.

Signed and sealed this 17th day of February 1970.

(SEAL)
Attest:

Edward M. Fletcher, Jr.                              WILLIAM E. SCHUYLER, JR.
Attesting Officer                                              Commissioner of Patents